United States Patent [19]

Cariou

[11] 4,396,669
[45] Aug. 2, 1983

[54] COMPOSITE CARBONACEOUS ARTICLES AND PROCESS FOR MAKING SAME

[75] Inventor: Yvon P. Cariou, Morris Plains, N.J.

[73] Assignee: Carbone USA Corporation, Boonton, N.J.

[21] Appl. No.: 180,170

[22] Filed: Aug. 22, 1980

[51] Int. Cl.³ .................. D04H 1/08; B05D 3/02
[52] U.S. Cl. ..................... 428/280; 427/227; 427/228; 427/240; 428/289; 428/408
[58] Field of Search .............. 427/227, 228, 240; 428/408, 289, 280

[56] References Cited

U.S. PATENT DOCUMENTS

| | | | |
|---|---|---|---|
| 2,670,305 | 2/1954 | Wiswesser | 427/240 |
| 3,462,289 | 8/1969 | Rohl et al. | 427/228 |
| 3,607,541 | 9/1971 | Tombrel | 427/228 |
| 3,657,061 | 4/1972 | Carlson et al. | 428/408 |
| 3,682,595 | 8/1972 | Okuda et al. | 427/228 |
| 3,854,979 | 12/1974 | Rossi | 427/228 |
| 3,944,686 | 3/1976 | Froberg | 427/228 |
| 3,956,548 | 5/1976 | Kovac et al. | 428/408 |
| 4,178,413 | 12/1979 | Demunda | 427/228 |
| 4,234,650 | 11/1980 | Schieber | 427/228 |
| 4,329,387 | 5/1982 | Goodrich et al. | 428/408 |

*Primary Examiner*—Norman Morgenstern
*Assistant Examiner*—Janyce A. Bell
*Attorney, Agent, or Firm*—Albert F. Kronman

[57] ABSTRACT

Disclosed is a composite carbonaceous article formed of carbon felt fabric intimately linked to vitreous carbon.

A carbonizable high carbon resin is cast or centrifuged onto a carbon or precursor felt fabric to form shapes which can then be baked to carbonizing or graphitizing temperatures.

14 Claims, 3 Drawing Figures

COMPOSITE CARBONACEOUS ARTICLES AND PROCESS FOR MAKING SAME

BACKGROUND OF THE INVENTION

This invention relates to shaped carbon and graphite articles and to an improved process for making same. These articles find utility in applications requiring the combination of carbon's inertness with a porous side and an imprevious side. Thus, typical applications include electrodes for zinc/halogen cells, sodium/sulfur batteries and as fuel cell separators.

DESCRIPTION OF THE PRIOR ART

Traditionally, shaped carbon articles have been made by forming a "green" mix of finely divided carbonaceous particles and pitch, shaping the mix and then baking or graphitizing the resulting shape. The art also has learned to form graphite fibers and to make fabric therefrom, such as screens, separators and the like.

SUMMARY OF THE INVENTION

The present invention provides a composite article consisting of vitreous carbon intimately linked to a carbon felt fabric. The present invention also provides an improved process for making such an article by linking to a felted carbon material or its precursor a polymerisable carbonizable high carbon resin and then baking the resulting composite resin felt material to a carbonizing or graphitizing temperature.

A sandwich structure consisting of alternate vitreous carbon and carbon or graphite felt layers can also be obtained by simultaneous or successive operations.

BRIEF DESCRIPTION OF THE DRAWING

In the accompanying drawing forming part hereof similar elements have been given the same reference numerals, in which drawings.

DETAILED DESCRIPTION

Figure 1:
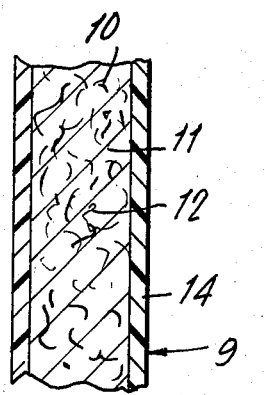
FIG. 1 is a cross sectional fragementary view of a composite carbonaceous article made in accordance with the present invention.

The resin used in the present invention is a carbonizable, polymerizable resin having a high carbon content in the range of 40 to 90 percent such as a furfural or phenolic resin or polyimides which after suitable heat treatment produces "vitreous" carbon. This material is called vitreous carbon because it has the appearance and characteristics of a black glass: it has a closed microporosity and is impervious to gas.

The material is obtained by carbonization and subsequent thermal treatment of carbonaceous materials with strong transversal molecular bonds. Carbon and graphite shapes made from this material are availble from Carbone U.S.A. Inc., 400 Myrtle Ave., Boonton, N.J. 07005.

Two grades are supplied which are obtained after two different heat treatments:
V10 is heat treated at 1,000° C.
V25 is heat treated at 2,000° C.

This last grade is more stable in dimension during thermal cycles and is to be preferred when sharp variations of temperature can occur or when maximum operating temperature is above 1,000° C.

| CHEMICAL CHARACTERISTICS | V 10 | V 25 |
|---|---|---|
| Maximum operating temperature | 1,000° C. | 2,500° C. |
| Apparent density | | 1.50 at 1.55 |
| Apparent porosity | | 0 |
| Permeability to gas at normal temperature | better than $10^{-10}$ cm$^2$/s | better than $10^{-6}$ cm$^2$/s |
| at 2,500° C. | | approx. $10^{-6}$ cm$^2$/s |
| Ash content | 0.02% (200 ppm) | 0.005% (50 ppm) |
| Sulphur content | 50 ppm | 50 ppm |
| Boron content | | 2 ppm |
| Oxidation resistance: | | |
| at 600° C. | 1 mg/cm$^2$/h | 0.1 mg/cm$^2$/h |
| at 800° C. | 25 mg/cm$^2$/h | 2 mg/cm$^2$/h |
| MECHANICAL PROPERTIES | | |
| Transverse breaking strength | 1,000 kg/cm$^2$ | 600 to 800 kg/cm$^2$ |
| Compressive strength | 3,000 kg/cm$^2$ | 1,500 to 2,500 kg/cm$^2$ |
| Shore hardness | 120-125 | 120-125 |
| Vickers microhardness (30 kgm) | 225 | 150-175 |
| Young's modulus | 2,850 kg/mm$^2$ | 2,200 kg/mm$^2$ |
| THERMAL PROPERTIES | | |
| Coefficient of thermal expansion | | |
| at 100° C. | | 3.2 × $10^{-6}$ by °C. |
| at 650° C. | | 3.5 × $10^{-6}$ by °C. |
| Thermal conductivity | 0.01 cal/cm/s/°C. | 0.02 cal/cm/s/°C. |
| Resistance to thermal shock | | |
| Air quenching acceptable from: to room temperature | 1,000° C. | 2,500° C. |
| ELECTRICAL PROPERTIES | | |
| Electrical resistivity | 5,500 microhm/cm | 4,500 microhm/cm |

The above described material forms one half of the composite.

The felted carbon fabric which forms the other half of the composite preferably has the following characteristics:

| General characteristics | Units | Carbon RVC | Graphite RVG |
|---|---|---|---|
| Carbon content | % | 94-97 | 99-100 |
| Ashes | % | 0.1 to 0.3 | below to 0.1 |
| Volatiles materials | % | 1.5 to 4 | below to 1 |
| Sulphur | % | 0.3 to 0.5 | below to 0.1 |
| Oxidation resistance (loss in weight after 48 h at 350° C. in air) | % | 4 to 12 | below to 1 |
| Fibre diameter | μ | about 10 | about 9 |
| Width of roll | m | 0.90 | 0.88 |

| Specific properties | Units | RVC 1000 | RVC 2000 | RVC 4000 | RVG 1000 | RVG 2000 | RVG 4000 |
| --- | --- | --- | --- | --- | --- | --- | --- |
| Max. length | m | 15 | 7 | 3 | 15 | 7 | 3 |
| Average thickness | mm | 1.3 | 4 | 10 | 1.2 | 3.5 | 9 |
| Weight/sq. meter | g | 135 | 250 | 950 | 130 | 220 | 900 |
| Tensile strength of 5 cm wide strip | kg N | ≃0.65 6.5 | ≃1.5 15 | ≃10 100 | ≃0.55 5.5 | ≃1 10 | ≃4 40 |
| Electrical resistance of a felt square | ohm | 1.9 | 1.15 | 0.30 | 1.7 | 1 | 0.20 |

The fibers constituting the felted fabic preferably have a diameter of four to eight microns. The materials above designated as RVC and RVG grades also are marketed by Carbone U.S.A. Corp.

The Catalyst used varies on the particular resin used in making the vitreous carbon and is not critical, as any of the well known polymerization catalysts can be employed. The preferred catalyst is aniline perchlorate which is formed in situ in the resin by separately adding aniline and perchloric acid. The amount of catalyst used normally ranges from one to ten weight percent basis resin, preferably about five percent.

The resin can be applied by either casting onto the carbon felt or by centrifuging a roll of felt with the resin. Generally from 0.1 to 2 grams of resin should be applied per cm$_2$ of fibers.

Referring to the drawing, FIG. 1 illustrates a composite carbonaceous article 9 formed of a carbon felt 10 made of carbon fibers 11. The transverse carbon fibers 12 of the felt 10 penetrate into the vitreous carbon 14 on each side of the felt.

Figure 2:
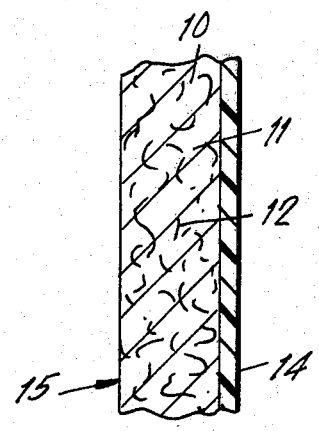
FIG. 2 is a view similar to FIG. 1 showing a second embodiment of the present invention.

In FIG. 2 there is shown a composite carbonaceous article 15 having a single layer of vitreous carbon 14 intimately linked to a single face of a carbon felt fabric in accordance with the present invention.

Figure 3:
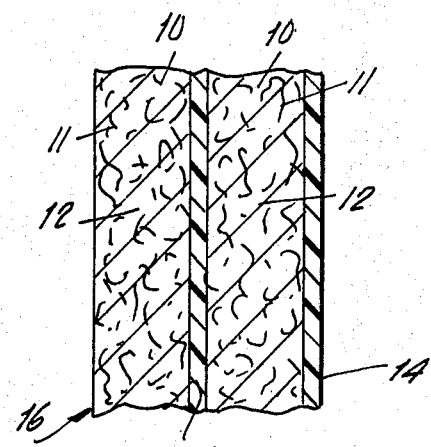
FIG. 3 is a view similar to FIGS. 1 and 2 showing still a further embodiment of the present invention.

FIG. 3 combines the structure of FIGS. 1 and 2 in providing for an article 16 in which alternate layers of felt fibers and vitreous carbon are linked together.

The invention is further illustrated in non-limiting fashion by the following examples.

EXAMPLE I

This example illustrates the casting aspect of the process. A furfural resin (Durez 16470) is mixed with five percent of aniline and perchloric acid and poured on a flat, chemically inert surface. The resin is allowed to thicken for four to five hours at ambient temperature (18° C.) or until its viscosity increases above 20,000 cps. Next a piece of felted fabric made of carbon fibers (RVC 1000) is cut and applied onto the mix of catalyzed resin. The assembly is then allowed to harden for twenty hours at room temperature after which it is cut to the desired dimension. In a modification, the fibers are precarbonized prior to being applied onto the resin. In another modification the untreated felt precursor is used.

EXAMPLE II

This example illustrates the centrifugal version of the present process. This version provides a better product because the resin can be applied more homogeneously to the fibers.

The resin is made up as in the preceding example and poured into a centrifuge rotated at a speed of about 100 rpm and allowed to thicken until its viscosity increases above about 20,000 cps. A roll of the carbon felt is then introduced into the centrifuge and the same is restarted to a speed of 150 rpm. Heat is applied to the centrifuge to bring the resin to its polymerization temperature of 100° to 200° C. while the machine is operated for three to four more hours. The centrifuge is stopped before the article hardens, the composite roll is unrolled and placed on a flat surface for cutting to the desired dimensions.

EXAMPLE III

This example illustrates the baking step of the invention. "Green" shapes obtained by either of the above examples are stacked in an iron crucible and separated from one another by flat separator plates such as graphite sheets of the same initial dimensions as the shapes. The "green" shapes then are heated to 700° to 1200° C. depending on the size and characteristics of shapes to obtain carbon/carbon composites. If a graphitized or a highly graphitized article is desired and if there is a need for increased purity or reduced specific surface area, the article is baked to 1500° to 3000° C.

Where a resin thickness of between about 0.2 mm and 2.5 mm is used, it is preferred to raise the baking temperature at a rate of about 3 to 5 degrees C./per hour. If the resin thickness is over 2.5 mm, it is preferred to raise the baking temperature by about 1 degree C. per hour.

The shrinkage due to baking is about 21%. The thickness of the vitreous carbon can be varied by incrmenets of 2/10 mm, up to 5 mm maximum. The thickness of the felt can be varied in the same fashion with no maximum limit.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A composite multi-layered carbonaceous article comprising:

a felted fabric member having at least two surfaces and being composed of carbon fibers, a layer of vitreous carbon being bonded to at least one of said surfaces to be completely located only at that surface to form two distinct layers which are bonded together;

said vitreous carbon having been produced by polymerizing on said fabric a carbonizable, polymerizable resin having a carbon content in the range of 40 to 90 percent, said layer having a closed microporosity and being gas impervious;

only some of said carbon fibers penetrating into said layer of vitreous carbon.

2. The article of claim 1, wherein alternate layers of fabric members and layers of vitreous carbon are integrally united to form a sandwich-like structure.

3. The article of claim 1, wherein said carbon fibers have a diameter of about four to eight microns.

4. The article of claim 1, wherein said vitreous carbon has a thermal conductivity ranging from 0.01 to 0.02 cal/cm/s/C and a transverse breaking strength of 600 to 1000 kg/cm$^2$, and said fibers have a carbon content in the range of 94 to 100%.

5. The article of claim 1, wherein said vitreous carbon and said fibers are graphitized.

6. A process for making a shaped composite multi-layered carbonaceous article comprising providing a felted fabric composed of carbon fibers, said fabric having at least two surfaces, bonding a carbonizable, polymerizable resin having a carbon content in the range of 40 to 90% and a polymerization catalyst to at least one of said surfaces under ambient temperature and pressure by polymerizing said resin to carbonizing or graphitizing temperatures so that said carbon is completely located only at the one surface to form two distinct layers which are bonded together.

7. The process of claim 6, wherein said resin is a furfural-based resin, a phenolic resin or a polyimide resin.

8. The process of claim 6, wherein the amount of resin applied to said fabric ranges from 0.1 to 2.0 gram per cm$^2$ of fabric.

9. The process of claim 6, wherein a thickness of resin of 2/10 to 2.5 mm is used and the temperature is increased at a rate of 3° to 5° C./hr.

10. The process of claim 6, wherein the thickness of resin used is over 2.5 mm and the rate of heating is increased by about 1° C./hr.

11. The process of claim 6, conducted by stacking a plurality of composite articles in a furnace, separating said articles by rigid, flat, separating means and heating to the desired temperature.

12. The process of claim 6, wherein contacting of said resin is effected by casting said resin on a substantially flat, rigid surface and placing said fabric thereon.

13. The process of claim 6, wherein contacting is conducted by centrifuging a roll of said fabric with said resin, heating to the polymerization temperature of said resin, unrolling the thus treated roll and baking same.

14. The process of claim 6, wherein said fabric is precarbonized prior to being applied to said resin.

* * * * *